United States Patent [19]
Payzant et al.

[11] Patent Number: 5,962,678
[45] Date of Patent: Oct. 5, 1999

[54] **METHOD OF EXTRACTING SELECTED SWEET GLYCOSIDES FROM THE *STEVIA REBAUDIANA* PLANT**

[75] Inventors: John Donald Payzant; James Kenneth Laidler; Robert Maurice Ippolito, all of Edmonton, Canada

[73] Assignee: Alberta Research Council, Edmonton, Canada

[21] Appl. No.: 09/019,558

[22] Filed: Feb. 6, 1998

Related U.S. Application Data

[63] Continuation-in-part of application No. 08/803,821, Feb. 24, 1997, abandoned.

[30] Foreign Application Priority Data

Sep. 13, 1996 [CA] Canada ..................................... 2185496

[51] Int. Cl.⁶ .............................. C07H 1/08; C07H 15/24
[52] U.S. Cl. ........................ 536/128; 536/18.1; 536/127
[58] Field of Search ........................ 424/195.1; 514/783; 536/4.1, 5, 6.3, 18.1, 127, 128

[56] References Cited

FOREIGN PATENT DOCUMENTS

| | | |
|---|---|---|
| 1112565 | 11/1995 | China . |
| 56121454 | 8/1924 | Japan . |
| 51-091300 | 8/1976 | Japan . |
| 56-121455 | 9/1981 | Japan . |
| 57-086264 | 5/1982 | Japan . |
| 61-202667 | 9/1986 | Japan . |
| 06007108 | 1/1994 | Japan . |
| 07177862 | 7/1995 | Japan . |

OTHER PUBLICATIONS

Wood et al. *J. Org. Chem.*, vol. 20:875–883. 1955.
Kohda et al. *Phytochemistry*, vol. 15:981–983. 1976.
Huang et al. *Zhiwu Ziyuan Yu Huanjing*, vol. 5(4):29–32. 1996.
Streidner et al. *Acta Biotechnol.*, vol. 11(5):495–499. 1991.
Fuh et al. *J. Food Sci.*, vol. 55(5): 1454–1457. 1990.
Aquino et al. *Boll.–Soc. Ital. Biol. Sper.*, vol. 61(9):1247–1252. 1985.
Li, Sishi. *Zhongguo Tiaoweipin*, vol. 9:10–11. 1984.
Huang et al. *Zhong caoyao*, vol. 15(8):379. 1984.

*Primary Examiner*—Howard C. Lee
*Attorney, Agent, or Firm*—Davis and Bujold

[57] ABSTRACT

Individual sweet glycosides are obtained from the stevia rebaudiana plant. A mixture of sweet glycosides extracted from the stevia rebaudiana plant are processed to remove impurities by using two ion exchange columns. After removing the mixed sweet glycosides from the second column with methanol the solution is dried. Upon refluxing the dried solids in a methanol solution and then cooling the solution, Stevioside precipitates out. The filtrate is further concentrated and cooled to precipitate out Rebaudioside A. This Rebaudioside A can be further purified as can the previously obtained Stevioside.

5 Claims, 1 Drawing Sheet

METHOD OF EXTRACTING SELECTED SWEET GLYCOSIDES FROM THE *STEVIA REBAUDIANA* PLANT

CROSS-REFERENCE TO RELATED APPLICATIONS

This is a continuation-in-part of application Ser. No. 08/803,821, filed Feb. 24, 1997, now abandoned.

BACKGROUND OF THE INVENTION

1. Field of the Invention

This invention relates to a method of extracting selected sweet glycosides from the stevia rebaudiana plant.

2. Description of the Previously Published Art

Japanese Patent 63173531, which issued in 1988 to Nakazato, describes a method of extracting sweet glycosides from the stevia rebaudiana plant. This method includes the following steps. The first step is to extract a liquid solution of sweet glycosides from the stevia rebaudiana plant. Secondly, the liquid solution of sweet glycosides is passed through a non-polar porous resin, such as amberlite XAD-2 and eluting with a water soluble organic solvent, preferably methanol. Thirdly, the eluted solution is concentrated and dried to give a powdery material. This procedure isolates a mixture of sweet glycosides, but it does not isolate pure single compound sweet glycosides and it especially does not isolate pure Rebaudioside A.

Subsequent patents, such as Korean Patent 9007421, have added to or varied the Nakazato process in an attempt to improve the purity and yield. Korean Patent 9007421, which issued in 1990 to Pacific Chemical Company, passes the eluted solution through a column which is packed with positive ion-exchange resin (preferably Diaion SK1B) and negative ion-exchange resin (Amberite IRA 904). Again it appears this is isolating a mixture of sweet glycosides, but it does not isolate pure single compound sweet glycosides and it especially does not isolate pure Rebaudioside A.

U.S. Pat. No. 4,892,938, to Giovanetto discloses a purification process in which the aqueous extracts of the plant are purified by passing these aqueous extracts through a series of ion-exchange resins which are selected to remove various impurities. The sweet glycosides remain in the water and are recovered by evaporation of the water. The advantage is that everything is done in water, while most other processes involve the use of a solvent at some point. The disadvantage is that the final product is quite impure with only about 70% is a mixture of the sweet glycosides. The balance is mainly material more polar than the sweet glycosides which we have identified as a complex mixture of polysaccharides (about 25%), and a small amount of yellow, oily material less polar than the sweet glycosides (about 5%).

This low polarity oil was isolated by chromatography. The flavor of the low polarity oil is very unpleasant. We have found this oil to be present in varying levels from 0.2 to 2.0% in every commercial product we have examined. Since of varying amounts this intensely off-flavored material is contained in the commercial materials it presents problems with quality control and flavor issues. The polysaccharide fraction also appears to contain off-flavor materials, but not as intense in flavor as the low polarity yellow oil.

The sweet glycosides obtained from Giovanetto process are always a mixture. We have determined that the two principle sweet glycosides are Stevioside and Rebaudioside A, and two of the minor sweet glycosides are Dulcoside and Rebaudioside C, although there are many other minor ones. We have isolated the two principle glycosides and we have found that there is a considerably different flavor between them with one being much more desirable than the other. Stevioside has an aftertaste which is undesirable. This aftertaste is present in Stevioside samples of even greater than 99% purity. On the other hand, Rebaudioside A does not possess an aftertaste and has a sweetness flavor comparable to sucrose. Thus it is recognized as having the most desirable sensory properties. In addition to this complexity, various impurities are also present and some of these possess undesirable flavors. The entire matter is further clouded by the extreme difficulty of doing analyzes. The analytical exercise pushes at the envelope of present technology and involves considerable art. Finally, the problem with the methods described above is that the resulting materials contain a mixture of all of the sweet glycosides.

OBJECTS OF THE INVENTION

It is an object of this invention to provide a process for extracting selected sweet glycosides from the stevia rebaudiana plant.

It is a further object of this invention to produce good tasting, high intensity sweeteners from the stevia rebaudiana plant.

It is a further object of this invention to provide a process for the isolation and purification of a specific, single individual sweet glycoside from the mixture of sweet glycosides which occurs in the stevia rebaudiana plant.

It is a further object of this invention to isolate Stevioside from the stevia rebaudiana plant.

It is a further object of this invention to isolate Rebaudioside A from the stevia rebaudiana plant.

It is a further object of this invention to isolate Rebaudioside A from the stevia rebaudiana plant which is free from the bitter yellow oil and other sweet glycosides.

It is a further object of this invention to isolate Rebaudioside A from the stevia rebaudiana plant which has a good flavor and which is undistinguishable from commercial aspartame.

It is a further object of this invention to further purify the initially isolated Rebaudioside A obtained from the stevia rebaudiana plant.

It is a further object of this invention when purifying from extracted selected sweet glycosides from the stevia rebaudiana plant to remove unwanted polysaccharides.

It is a further object of this invention to purify extracted selected sweet glycosides from the stevia rebaudiana plant and to remove the unwanted bitter yellow oil.

It is a further object of this invention to provide a process to produce a crystallized solid containing a higher concentration of the selected sweet glycoside from selected sweet glycosides which have been extracted from the stevia rebaudiana plant.

These and further objects of the invention will become apparent as the description of the invention proceeds.

SUMMARY OF THE INVENTION

Sweet glycosides extracted from the stevia rebaudiana plant are processed to obtain individual components in a multi-step process. First, the stevia rebaudiana plant is treated to extract an aqueous liquid solution containing mixed sweet glycosides. By using a series of ion exchange resins the impurity non-sweet glycosides are separated from the mixed sweet glycosides which are dried. These dried mixed sweet glycosides which still contain impurities are dissolved in a water-soluble organic solvent such as anhydrous methanol to form a solution which is refluxed and then cooled to precipitate a first sweet glycoside component. This first sweet glycoside component, which is typically Stevioside, can be recovered by filtering and it can be further purified by the method described infra for the second component.

The initial separation of the non-sweet glycosides from the mixed sweet glycosides can preferably be done by passing the mixture through a first resin column which absorbs the non-sweet glycosides and permits the mixed sweet glycosides to pass through. These mixed sweet glycosides can then be absorbed on to a second resin column and subsequently eluted with a water-soluble organic solvent such as methanol to form a mixture which can be spray dried to obtain the solid mixed sweet glycosides.

The filtrate from the precipitation of the first precipitated sweet glycoside can be further treated to obtain a second sweet glycoside component by concentrating the filtrate by heating. Upon cooling the solution a second sweet glycoside component precipitates which can be recovered. This second sweet glycoside component is typically Rebaudioside A. It can be further purified by dissolving it in a water soluble organic solvent such as methanol that can optionally contain a small amount of water. The solution is heated, refluxed, and finally cooled to precipitate the second sweet glycoside component at a higher purity. The precipitate can be recovered by filtration. This purification process can be repeated until a final crystallized solid of desired purity is obtained.

BRIEF DESCRIPTION OF THE DRAWINGS

The FIGURE illustrates a flow chart for the process.

DESCRIPTION OF THE PREFERRED EMBODIMENTS

Figure 1:
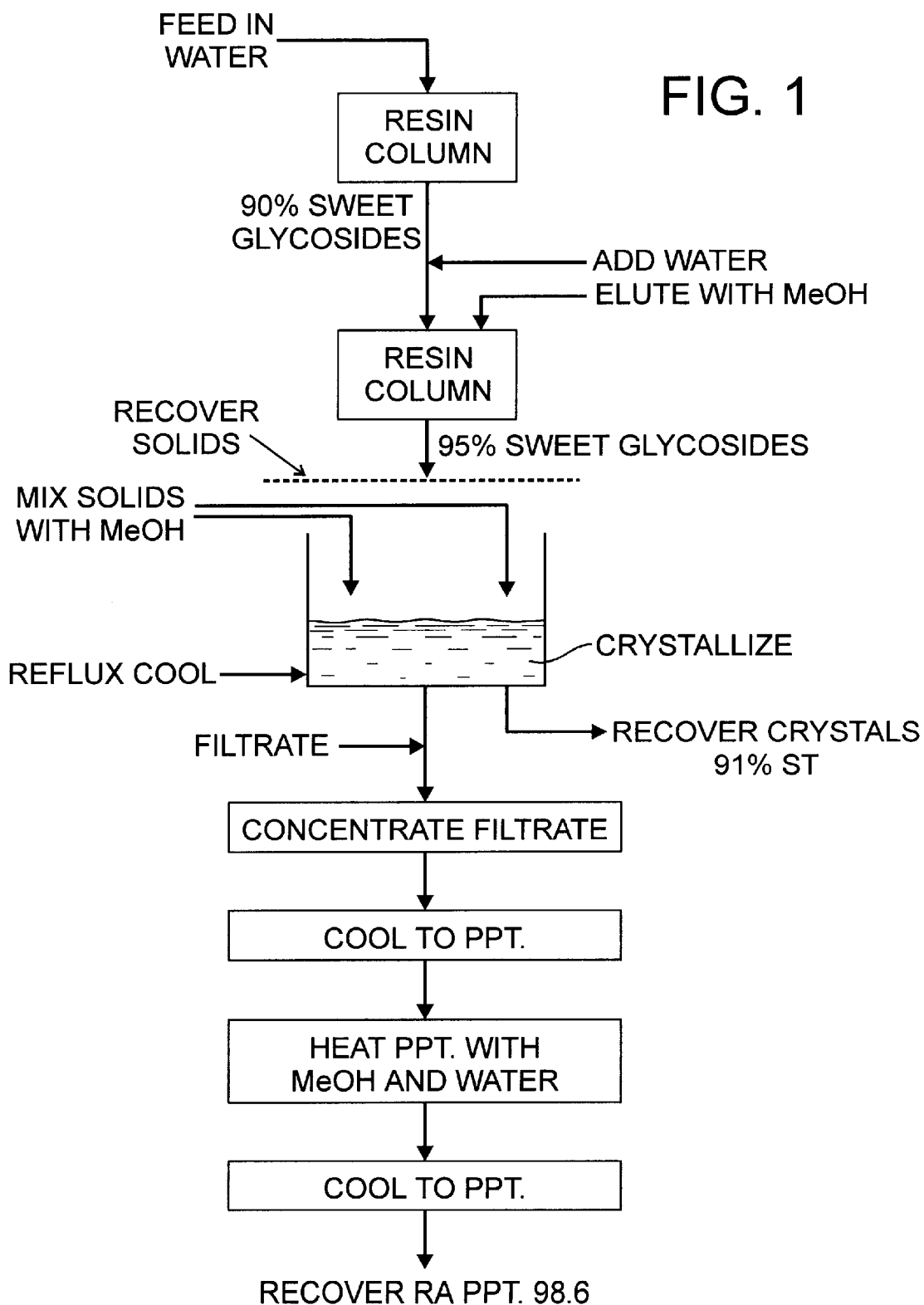

The sweet glycosides are first extracted from the stevia rebaudiana plant as a liquid solution. There are a variety of suitable extraction methods described in the technical literature. Beneficial results have been obtained through the use of room temperature water. We prefer not to use hot water because the leaves become a mushy mass that it very difficult to separate from the liquid. Hot water also tends to extract many things from the leaves other that sweet glycosides which have to be removed in subsequent steps. The plant solids are separated followed by the addition of lime and removal of precipitated solids. This initial extraction sequence is common in most of the processes for extracting the sweet glycosides and it is the one employed in the sugar beet industry.

Following the procedure disclosed in the Giovanetto patent this extraction solution is passed through a first resin column to obtain a more purified sweet glycoside composition by absorbing other materials from the plant. These materials being absorbed are a complex mixture of substances derived from the plant. Organic acids and bases, inorganic salts, tannic or phenol like substances, substances derived from the photosynthetic apparatus, proteins and ammino acids just to name some, would all be expected to be removed by this treatment. The precise materials removed are not known. The liquid flowing from the resin column which is not absorbed by the resins contains the sweet glycosides and it is spray dried to obtain a solid having about 70% sweet glycosides.

The sprayed dried sweet glycosides are then mixed with water and the liquid solution is passed through a second chromatographic column of resin layers. There are a variety of suitable resins. It is preferred, however, that the resin be based upon acrylic ester chemistry. An example of such a resin is the Amberlite XAD-7 resin commercially available through Rhom and Haas. An alternative resin is reverse phase C18 bonded silica. During column chromatography the sweet glycosides tend to be absorbed by the resin along with, unfortunately, the bitter yellow oil. However, the polysaccharide impurities and the non-sweet glycosides are not absorbed onto the resin from water and thus they are carried away with the water.

The sweet glycosides are eluted from the second resin using a water soluble organic solvent to recover a liquid solution of mixed sweet glycosides with some impurities removed. The preferred form of water soluble organic solvent is a methanol solution. The eluted methanol solution is dried to remove the methanol and any water that may be present. The solid has about 95% sweet glycosides.

The dried solid is mixed with anhydrous methanol and refluxed. Upon cooling a selected sweet glycoside precipitates out and is recovered by filtration. The selected sweet glycoside will normally be Stevioside. The liquid filtrate is used for the next step to recover a second sweet glycoside and the yellow oil remains in the liquid methanol solution.

The anhydrous methanol liquid filtrate is concentrated by heating and then cooled to precipitate a second sweet glycoside which is normally Rebaudioside A in a relatively impure form of about 79%. The solid precipitate is recovered and the remaining methanol solution contains the yellow oil.

The relatively impure form of the second sweet glycoside is further purified by dissolving the precipitate in methanol to which a relatively small amount of water is added. The mixture is heated and upon cooling the second sweet glycoside in the form of Rebaudioside A precipitates out at a higher purity level.

This last purification step can be repeated again to further increase the purity of the precipitated Rebaudioside A to a level higher than about 90% and more preferably higher than 95%.

Having described the basic aspects of the invention, the following examples are given to illustrate specific embodiments thereof.

EXAMPLE 1

This example illustrates a preliminary process for obtaining the sweet glycosides via an aqueous solution from the stevia rebaudiana plant by the Giovanetto water extraction method.

Following the procedure in U.S. Pat. No. 4,892,938 to Giovanetto an aqueous extract was obtained. This aqueous extract containing the sweet glycosides was passed through a sequence of three ion exchange resin columns. The resins were made by Dow Chemical Co. and were designated by Dow as D-11, D-66 and D-88. Columns were prepared in accordance with the manufacture's instructions. The aqueous solution which came out of these columns was sprayed dried. The solid contained 70% of a mixture of sweet glycosides which is used as the starting material for Example 2. It is really not known with any precision what is being removed by these various resins in these three columns. The materials are a complex mixture of substances derived from the plant. Organic acids and bases, inorganic salts, tannic or phenol like substances, substances derived from the photosynthetic apparatus, proteins and ammino acids just to name some, would all be expected to be removed by this treatment.

COMPARISON EXAMPLE 1

This example illustrates the undesirable product obtained if the material from Example 1 is just directly crystallized without first further removing the bulk of the non-sweet glycoside materials.

Crystallization from methanol of the impure mixture of sweet glycosides from the water extraction process in Example 1 from the Giovanetto patent was tried. The yield of crystalline material was poor. The total yield of crystalline solids was never greater than the 20–30% range and the times required for crystallization were typically in the fifteen day range. Because of these poor results, no analysis was done on the fractions. The problem was identified as the presence of some 30% or so of impurities because the mixture was only 70% sweet glycosides as measured in Example 1.

EXAMPLE 2

This example illustrates the separation of the bulk of the non-sweet glycosides materials from the sweet glycosides.

The reason for this separation is that there will be a large increase in yield of the recovered crystalline material in the subsequent steps. Using a crude mixture of the sprayed dried sweet glycosides obtained by the Giovanetto process of Example 1, 10.1 grams were dissolved in 102 grams of water. This solution was applied to a second resin column. The column has a one inch diameter and contained 100 grams of Amberlite XAD-7 resin manufactured by Rhom and Haas Company. The resin was conditioned or cleaned by washing sequentially with water, methanol, and finally with water. The aqueous solution of crude sweet glycosides was allowed to flow down this resin column at a rate of about 15 ml/min. Elution was with water and 100 ml fractions were collected. After the collection of 6 fractions, the column was eluted with methanol and 6 additional fractions were collected. The aqueous fractions were dried, analyzed and found to contain less than 5% sweet glycosides. The methanol fractions were dried, analyzed and found to contain greater than 95% sweet glycosides.

The mixture of sweet glycosides in the methanol solution is dried to remove minor amounts of water which reduce the yield in subsequent crystallization steps. Since the sweet glycosides were absorbed on to the XAD-7 resin from water, there is water contained within or on the surface of this resin and this water is removed with the methanol. The only reason for going to dryness is to remove this water. If the minor amount of water wasn't there or if it were removed by the some other means, then the methanol could be removed by evaporation to some level and then the sweet glycosides would crystallize from the solution.

EXAMPLE 3

This example illustrates the separation of Stevioside from the mixture of sweet glycosides by crystallization from methanol.

A precipitated mixture of sweet glycosides containing Dulcoside, 3.6; Stevioside, 60.0%; Rebaudioside C, 7.8%; and Rebaudioside A, 24.8% was prepared in a manner similar to that described above in Example 2 and 5.4 grams were dissolved in 15.0 grams of anhydrous methanol by heating to reflux. For this initial crystallization of the glycosides from methanol it is preferred to use anhydrous methanol for the best yields. By being anhydrous or as free from water as possible the crystalline yield is maximized and the crystallization time is minimized. For example, 0.5% water in the methanol in this initial crystallization will significantly reduce the yield. The resulting initially homogeneous solution began to become turbid within minutes of reflux showing the onset of crystallization. The resulting suspension was allowed to cool to room temperature and after 3 hours the precipitate was filtered by suction and washed with a small amount of about 10 grams of methanol. After drying, the precipitate weighed 2.7 grams and contained Dulcoside, 0.0%; Stevioside 91.6%; Rebaudioside C, 0.48%; and Rebaudioside A, 7.9%. The methanol filtrate was further treated as described in Example 4 below.

Thus Stevioside can be further purified, if desired, by using the purification technique set forth in Example 5 below. Stevioside of 90+% from methanol-water mixtures gave material of better than 99% purity.

EXAMPLE 4

This example illustrates the subsequent separation of Rebaudioside A from the mother liquor by further crystallization from methanol.

The anhydrous methanol filtrate from Example 3 above was concentrated on a rotary evaporator until the flask contained a net weight of 6.2 grams consisting of a mixture of the remaining sweet glycosides and methanol. This mixture was cooled to 0° C. overnight for a period of about 16 hours. The resulting precipitate was filtered by suction, washed with a small volume of cold methanol, and dried to obtain 0.5 grams of an impure Rebaudioside A material which contained Dulcoside, 1.3%; Stevioside 4.7%, Rebaudioside C, 15.1%; and Rebaudioside A, 79.0%. The methanol filtrate remaining contains the yellow oil.

EXAMPLE 5

This example illustrates the additional purification of Rebaudioside A that can be done by crystallization from a methanol mixture to afford Rebaudioside A of greater than 95% purity.

An impure Rebaudioside A (note—not from Example 4) containing Dulcoside, 0.0%; Stevioside 5.4%; Rebaudioside C, 4.3%; and Rebaudioside A, 90.2% in an amount of 4.9 grams was heated to reflux with 65 grams methanol and 10 grams of water. This minor amount of water in the methanol is desirable as it reduces the volume of solvent which must be manipulated and serves as a convenience in the laboratory. On a commercial scale anhydrous methanol might be more convenient. After a few minutes a homogenous solution resulted and this was allowed to cool to room temperature overnight for about 16 hours. The resulting precipitate was filtered by suction, washed with about 25 ml of methanol, and dried to obtain 3.3 grams of material containing Dulcoside, 0.0%; Stevioside 0.5%; Rebaudioside C, 0.9%; and Rebaudioside A, 98.6%.

There are an almost unlimited number of variations on the above method in which time, temperature and solvent volumes and ratios can be varied and similar results obtained.

It is understood that the foregoing detailed description is given merely by way of illustration. It will be apparent to one skilled in the art that modifications and variations may be made to the illustrated embodiments without departing from the spirit and scope of the invention as hereinafter defined in the claims.

What is claimed is:

1. A method of extracting Rebaudioside A from a mixture of Rebaudioside A and Stevioside obtained from the *Stevia rebaudiana* plant comprising the steps of:
   a) treating the *Stevia rebaudiana* plant to extract an aqueous liquid solution containing mixed sweet glycosides and non-sweet glycosides;
   b) separating the non-sweet glycosides from the mixed sweet glycosides and drying the mixed sweet glycosides;
   c) dissolving the mixed sweet glycosides obtained in step (b) with solvent selected from the group consisting of methanol or methanol-water solution to form a solution, refluxing the solution and then cooling the solution to precipitate Stevioside;
   d) filtering the solution to recover the precipitate Stevioside and a filtrate containing other sweet glycosides;
   e) concentrating the filtrate from step (d) by heating and then cooling the solution to precipitate Rebaudioside A;
   f) dissolving the precipitate Rebaudioside A in a solvent selected from the group consisting of methanol or methanol-water solution to form a solution, refluxing the solution and then cooling the solution to precipitate the Rebaudioside A at a higher purity; and
   g) recovering the higher purity Rebaudioside A.

2. A method according to claim 1, wherein the separating of the non-sweet glycosides from the mixed sweet glycosides in step (b) comprises the steps of
   1) passing the mixture of the sweet and non-sweet glycosides through a first resin column which absorbs the non-sweet glycosides and which lets the mixed sweet glycosides pass through;
   2) passing the mixed sweet glycosides from step (1) through a second resin column which absorbs the mixed sweet glycosides;
   3) eluting the mixed sweet glycosides from the second resin with a water-soluble organic solvent to form a mixture; and
   4) spray drying the mixture to obtain the solid mixed sweet glycosides.

3. A method according to claim 1, wherein the solvent in step (c) is anhydrous methanol.

4. A method according to claim 1, further comprising repeating steps (f) and (g) until a final crystallized solid of desired purity of Rebaudioside A is obtained.

5. A method according to claim 4 wherein the desired purity of Rebaudioside A is at least 95%.

* * * * *